United States Patent [19]

Dominguez et al.

[11] Patent Number: 4,582,887

[45] Date of Patent: Apr. 15, 1986

[54] REACTION INJECTION MOLDED ELASTOMERS

[75] Inventors: Richard J. G. Dominguez; David R. McCoy, both of Austin, Tex.

[73] Assignee: Texaco Inc., White Plains, N.Y.

[21] Appl. No.: 645,599

[22] Filed: Aug. 30, 1984

[51] Int. Cl.⁴ .................... C08G 18/38; C08G 18/50; B28B 1/24; C08K 3/40

[52] U.S. Cl. .................... 528/48; 521/110; 521/111; 528/49; 528/122; 264/328.1; 264/DIG. 83; 524/494

[58] Field of Search .................... 528/48, 49; 521/110, 521/111; 524/494

[56] References Cited

U.S. PATENT DOCUMENTS

| | | | |
|---|---|---|---|
| 3,391,054 | 7/1968 | Lewis et al. | 161/186 |
| 3,523,918 | 8/1970 | Gonzalez | 521/110 |
| 3,838,076 | 9/1974 | Moss et al. | 521/167 |
| 3,847,992 | 11/1974 | Moss | 521/164 |
| 3,886,226 | 5/1975 | Asai et al. | 528/65 |
| 4,118,536 | 10/1978 | Beardsley et al. | 528/65 |
| 4,218,543 | 8/1980 | Weber et al. | 521/51 |
| 4,246,363 | 1/1981 | Turner et al. | 521/163 |
| 4,254,010 | 3/1981 | Mizuno et al. | |
| 4,254,069 | 3/1981 | Dominguez et al. | 264/51 |
| 4,269,945 | 5/1981 | Vanderbider et al. | 521/163 |
| 4,272,618 | 6/1981 | Dominguez et al. | 521/160 |
| 4,288,563 | 9/1981 | Thorpe | 528/48 |
| 4,396,729 | 8/1983 | Dominguez et al. | 521/163 |
| 4,444,910 | 4/1984 | Rice et al. | 521/51 |
| 4,456,718 | 6/1984 | Brinkmann et al. | |
| 4,474,900 | 10/1984 | Dominguez | 521/110 |

OTHER PUBLICATIONS

Schwartz et al., Jour., Elastomers & Plastics, vol. 11, (Oct., 1979) pp. 280-299.

Galli, Plastics Compounding, (Jan.-Feb. 1982) pp. 21-28.

*Primary Examiner*—Herbert S. Cockeram
*Attorney, Agent, or Firm*—Jack H. Park; Kenneth R. Priem

[57] ABSTRACT

This invention relates to reaction injection molded elastomers derived from high molecular weight amine terminated polyethers and/or high molecular weight polyols, a chain extender, a polyisocyanate, a chloro and/or isocyanate silane coupling agent, and untreated filler material. The reaction injection molded (RIM) elastomers of this invention are useful, for example, as automobile body parts.

17 Claims, No Drawings

REACTION INJECTION MOLDED ELASTOMERS

ABSTRACT OF THE DISCLOSURE

This application is related to application Ser. No. 503,382 filed June 8, 1983, now allowed. Also related are the following applications filed of even date: Ser. No. 645,721, and Ser. No. 645,600.

BACKGROUND OF THE INVENTION

1. Field of the Invention

This invention concerns the field of reaction injection molded elastomers.

2. Description of the Prior Art

U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. Nos. 3,838,076 and 3,847,992 disclose foams made from amine terminated polyethers, wherein the amine termination ranges from 10 to 50 percent and 15 to 55 percent, respectively.

Quillery's U.S. Pat. No. 3,523,918 describes the use of amine chain extenders for the preparation of integral skin foams. Also, Weber's et al. U.S. Pat. No. 4,218,543 describes the use of high molecular weight polyols, certain aromatic diamines and isocyanates for the production of RIM parts. This patent assigned to Bayer specifically claims as a chain extender 1-methyl-3,5-diethyl-2,4-diaminobenzene (diethyltoluene diamine) and its isomer.

Turner's U.S. Pat. No. 4,246,363 claims a RIM polyurethane composition derived from using at least three different polyols (including amine terminated polyethers) having specific relationships and reactivity and solubility parameters to one another. Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

Previously filed applications, Ser. No. 371,377 and U.S. Pat. Nos. 4,396,729; 4,444,910, and 4,433,067 relate to elastomers prepared using a high molecular weight amine terminated polyether, an aromatic diamine chain extender and a polyisocyanate which may be merely a polyisocyanate or a quasi-prepolymer prepared from a polyol reacted with a polyisocyanate wherein isocyanate groups are still left unreacted.

The paper "Silane Effects and Machine Processing in Reinforced High Modulus RIM Urethane Composites," by E. G. Schwartz, et al., *Journal of Elastomers and Plastics*, volume 11 (October 1979), page 280, describes the use of silane treated milled glass fibers in reinforced RIM composites.

The article "Surface Modification for RRIM Urethanes," by Ed Galli, *Plastics Compounding*, (January/February 1982) discloses silane treated glass fiber reinforcement of RRIM urethanes. The emphasis is on amino silanes.

The publication "Silane Coupling Agents," by Dow Corning Corporation discusses various silane coupling agents and their applications.

Application Ser. No. 502,382 filed June 8, 1983, discloses and claims the use of epoxy modified filler material in RIM elastomers made from high molecular weight amine teminated polyethers and/or polyols.

Application Ser. No. 645,600 filed of even date related to epoxy silane added separately to a B-component containing filler material.

In conventional RIM systems, the so-called A-component contains the isocyanate, whether it is pure isocyante or a quasi-prepolymer, and a B-component which contains the active hydrogen containing materials, catalysts if needed, and most other additives, including reinforcing materials and fillers such as glass in various forms including, for example, fibers, flaked, or milled.

We have found that untreated reinforcing materials and fillers added separately from chloro and isocyanate silane to the liquid components of a conventional RIM system display advantages similar to those disclosed for adding pretreated filler materials as in Ser. No. 502,382 referred to above.

SUMMARY OF THE INVENTION

The invention is reaction injection molded (RIM) elastomer comprising a cured reaction product of polyols of greater than about 1,500 molecular weight and/or primary or secondary amine terminated polyethers of greater than 1,500 molecular weight, a chain extender, a chloro and/or isocyanate silane coupling agent, untreated filler material, and an aromatic polyisocyanate. The invention is also a method of preparation of a RIM elastomer, as described above.

DESCRIPTION OF THE PREFERRED EMBODIMENTS

The polyols useful in the process of this invention include polyether polyols, polyester diols, triols, tetrols, etc., having an equivalent weight of at least 500, and preferably at least 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

Especially preferred are amine terminated polyethers including primary and secondary amine terminated polyether polyols of greater than 1,500 average molecular weight having from 2 to 6 functionality, preferably from 2 to 3, and an amine equivalent weight from about 750 to about 4,000. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxy groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

Also, mixtures of polyols and amine terminated polyethers are included within the scope of my invention.

The chain extenders useful in the process of this invention are preferably difunctional. Mixtures of difunctional and trifunctional chain extenders are also useful in this invention. The chain extenders useful in this invention include diols, (ethylene glycol and 1,4-butane diol, for example) amino alcohols, diamines or mixtures thereof.

The aromatic diamine chain extenders useful in this invention include, for example, 1-methyl-3,5-diethyl-2,4 diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula

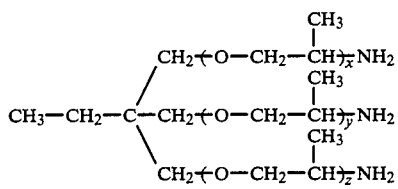

wherein $x+y+z$ has a value of about 5.3. The average amine hydrogen equivalent weight is about 67 and the product is commercially available from Texaco Chemical Company as JEFFAMINE® T-403. Another related polyoxypropylene polyamine is represented by the formula

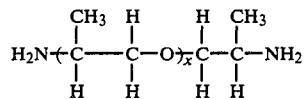

wherein x has a value of about 5.6 This product has an average amine hydrogen equivalent weight of about 100 and is commercially available from Texaco Chemical Company as JEFFAMINE D-400. The product having the same formula as above wherein x has an average value of about 2.6 is also useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

A wide variety of aromatic polyisocyanates may be used here. Typical aromatic polyisocyantes include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as analine, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

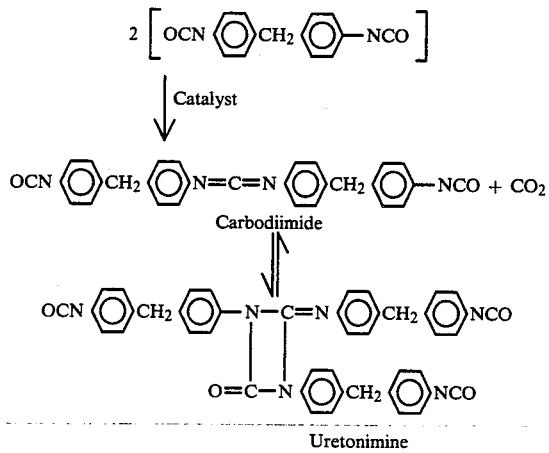

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

If needed, the following catalysts are useful. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannus oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Chloro and/or isocyanate silane coupling agents are useful in this invention. Exemplary of these materials are monomers of the formula $R-SiX_3$, where R is the chloro or isocyanate group and X are hydrolizable groups which are converted to silanol groups when hydrolized. Typical examples are:

$$Cl(CH_2)_3Si(OCH_3)_3 \text{ and } NCO(CH_2)_3Si(OCH_3)_3$$

The chloro silane is preferred.

Other similar materials known to those skilled in the art are included in the scope of this invention.

Reinforcing or filler materials useful in the practice of this invention are, for example, materials such as fiberglass, milled glass, flaked glass, mica or Wollastonite. Especially useful is flaked glass. Untreated materials such as those above are preferred for this invention. Of course, reinforcing or filler materials which have been treated with various sizing agents such as epoxy, amine or isocyanate, for example, can also be used so long as the chloro and/or isocyanate silane coupling agent is also added separately. Pending application Ser. No. 502,382 filed June 8, 1983, claims RIM elastomers using epoxy modified filler materials.

Mold release agents useful for the method of this invention are internal mold release agents. The preferred mold release agent is Dow-Corning Q2-7119. This mold release agent is a dimethyl siloxane with organic acid groups manufactured by Dow-Corning Corporation.

Post curing of the elastomers of the invention is optional. Post curing will improve some properties such as heat sag. Employment of post curing, however, depends on the desired properties of the end product.

EXAMPLE 1

In this example, the following formulation was run in an Accuratio VR-100 machine and plaques of the composite RIM material were made:

| B-component | |
|---|---|
| JEFFAMINE ® T-5000 | 62.33 pbw |
| Diethyltoluenediamine (DETDA) | 27.5 pbw |
| 3-chloropropyltrimethoxy-silane coupling agent | 1.0 pbw |
| OCF 1/64" flakeglass (unsized)* | 43.1 pbw |
| A Component | |
| Upjohn Code 205 Isocyanate (a 2:1 by wt. quasi-prepolymer of Isonate ® 143L and Thanol ® SF-5505) | 81.6 pbw |

Plaques of this material had properties as are listed in Table 1. When exposed to 400° F. for one hour, test coupons to these plaques had no unacceptable surface blistering or distortion.

EXAMPLE 2

In this example the same formulation as in Example 1 was run in an Accuratio VR-100 RIM machine except that 1.0 pbw of isocyanatopropyltrimethoxysilane was also added to the A-component. The properties of this material are listed in Table 1. When exposed to 400° F. for one hour, test coupons of these plaques had no unacceptable surface blistering or distortion. This example illustrates the utility of blends of coupling agents.

EXAMPLE 3

In this example, the same formulation as in Example 1 was run in the Accuration VR-100 RIM machine, except that instead of the 1.0 pbw of 3-chloropropyl-trimethoxy-silane coupling agent that was added to the B-component of Example 1, 1.0 pbw of isocyanato-propyltrimethoxy-silane coupling agent was added to the A-component. The properties of this material are listed in Table 1. When exposed to 400° F. for one hour, test coupons of these plaques had no unacceptable surface blistering or distortion.

COMPARISON EXAMPLE A

The same formulation as in Example 1 was run in the Accuratio VR-100 RIM machine except that no sizing was added to either the A- or B-components. This composite could not withstand 400° F. for one hour without blistering. In fact, gross blisters and surface distortions were evident in this material when it was exposed to the 400° F. temperature. The properties of this material appear in Table 1.

TABLE I

| Material Properties | Example 1[1] | Example 2[1] | Example 3[1] | Comparison Example A[1] |
|---|---|---|---|---|
| Tensile strength, psi | 3,000 | 2,886 | 2,710 | 2,600 |
| Elongation, % | 66 | 56 | 48 | 48 |
| Flexural modulus, psi | | | | |
| Measured at RT | 182,000 | 186,000 | 182,000 | 168,000 |
| 158° F. | 133,000 | 136,000 | 128,000 | 123,000 |
| −20° F. | 318,000 | 304,000 | 294,000 | 316,000 |
| 311° F. | 110,000 | 114,000 | 115,000 | 124,000 |
| Heat sag, mm | | | | |
| Measured at 250° F. | 3 | 3 | 2 | 0.5 |
| 311° F. | 7.5 | 7.55 | 7 | 5.8 |
| 400° F. | 40 | 40 | 42 | 40.6 |

[1] Isocyanate index = 1.05; post cured one hour at 250° F.; 20% by weight flakeglass 1/64"

On inspection of Table I, several conclusions can be drawn:

1. The tensile strengths of composites containing coupling agents (Examples 1, 2, and 3) are higher than the tensile strength of the composite containing no coupling agent, Comparison Example A. This is especially the case in Example 1.
2. The flexural modulus at room temperature is higher for the composites containing no coupling agents.

As described in the examples containing coupling agents (Examples 1, 2, and 3) no distortion or blistering was observed when these materials were exposed to 400° F. for one hour, whereas gross distortion and blistering are observed at these conditions with the composite with no coupling agent (Comparison Example A).

GLOSSARY OF TERMS AND MATERIALS

ISONATE® 143L—Carbodiimide modified liquid MDI; a product of the Upjohn Co.

JEFFAMINE® T-5000—Polypropylene oxide triamine of about 5,000 molecular weight; a product of Texaco Chemical Co.

DETDA—Diethyltoluene diamine; a product of Ethyl Corp.

THANOL® SF-5505—A 5500 molecular weight polyether triol containing approxmately 80% primary hydroxy groups.

THANATE® L-55-0—Quasi-prepolymer—A quasi-prepolymer formed by reacting equal weight of ISONATE 143L and THANOL SF-5505; a product of Texaco Chemical Co.

I claim:

1. A reaction injection molded elastomer made by reacting in a closed mold amine terminated polyethers of greater than 1,500 average molecular weight having greater than 50% of their active hydrogen in the form of amine hydrogens, a chain extender, a chloro silane coupling agent, untreated filler material, and an aromatic polyisocyanate.

2. An elastomer as in claim 1 wherein the filler material is glass based.

3. An elastomer as in claim 1 wherein the chain extender is diethyltoluene diamine.

4. An elastomer as in claim 1 wherein the polyisocyanate is a quasi-prepolymer.

5. A method for making a reaction injection molded elastomer comprising reacting in a closed mold amine terminated polyethers greater than 2,500 average molecular weight having greater than 50% of their active hydrogen in the form of amine hydrogens, a chain extender, a chloro silane coupling agent, untreated filler material and an aromatic polyisocyanate.

6. A method as in claim 5 wherein the filler material is glass based.

7. A method as in claim 5 wherein the chain extender is diethyltoluene diamine.

8. A method as in claim 5 wherein the polyisocyanate is a quasi-prepolymer.

9. A method for making a reaction injection molded elastomer comprising reacting in a closed mold amine terminated polyethers of at least 5,000 molecular weight and having a functionality of from about 2 to 3 having greater than 50% of their active hydrogen in the form of amine hydrogens, an amine terminated chain extender, a chloro silane coupling agent, untreated filler material and an aromatic polyisocynate.

10. A method as in claim 9 wherein the chain extender is diethyltoluene diamine.

11. A method as in claim 9 wherein the filler material is glass based.

12. A reaction injection molded elastomer made by reacting in a closed mold a polyether polyol having an equivalent weight of at least 500, a chain extender, a chloro silane coupling agent, untreated filler material and an aromatic polyisocyanate.

13. A method for making a reaction injection molded elastomer comprising reacting in a closed mold a polyether polyol having an equivalent weight of at least 500, a chain extender, a chloro silane coupling agent, untreated filler material and an aromatic polyisocyanate.

14. A reaction injection molded elastomer made by reacting in a closed mold amine terminated polyethers of greater than 1,500 average molecular weight having greater than 50% of their active hydrogen in the form of amine hydrogens, a chain extender, an isocyanate silane coupling agent, untreated filler material, and an aromatic polyisocyanate.

15. A method for making a reaction injection molded elastomer comprising reacting in a closed mold amine terminated polyethers greater than 1,500 average molecular weight having greater than 50% of their active hydrogen in the form of amine hydrogens, a chain extender, an isocyanate silane coupling agent, untreated filler material and an aromatic polyisocyanate.

16. A reaction injection molded elastomer made by reacting in a closed mold a polyether polyol having an equivalent weight of at least 500, a chain extender, an isocyanate silane coupling agent, untreated filler material and an aromatic polyisocyanate.

17. A method for making a reaction injection molded elastomer comprising reacting in a closed mold a polyether polyol having an equivalent weight of at least 500, a chain extender, an isocyanate silane coupling agent, untreated filler material and an aromatic polyisocyanate.

* * * * *